United States Patent Office 3,194,243
Patented July 13, 1965

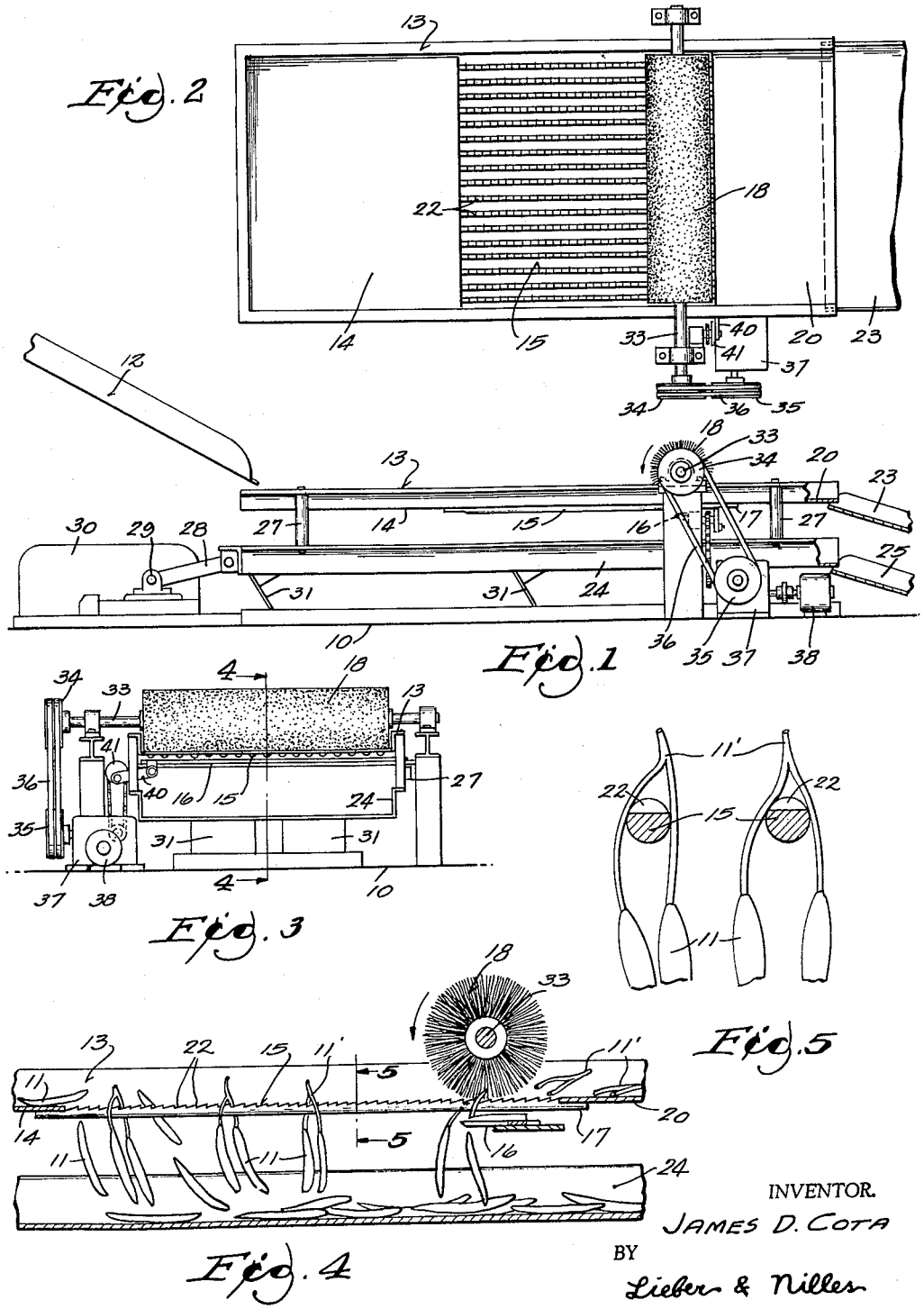

3,194,243
SEPARATOR AND CLUSTER BREAKER
James D. Cota, 324 Orchard St., Gillett, Wis.
Filed July 17, 1963, Ser. No. 295,718
7 Claims. (Cl. 130—30)

The present invention relates generally to improvements in the art of separation, and relates more particularly to an improved apparatus for separating individual products such as beans from clusters of such products which are joined by stems and then severing the joining means to separate the individual beans from the clusters.

A primary object of the invention is to provide an improved bean separator and cluster breaker which is extremely simple and compact in construction, economical in cost, and highly efficient in operation.

In the harvesting of stemmed products such as beans, it has become common practice to utilize mechanical devices. While such devices have eliminated a considerable amount of tedious and time-consuming manual labor, they frequently tear the product from the plant in clusters. Accordingly, it becomes necessary for the processors to provide for the separation of the individual beans which were properly stripped by the picker from the clusters which were torn from the plant, and to also provide means for snipping the furcated stems of the clusters to thereby separate the individual beans from such clusters.

Mechanical devices for thus separating stemmed products and for breaking clusters thereof have also been heretofore proposed, but the known prior devices available for such purposes have all been found objectionable for various reasons. For example, U.S. Patent No. 2,587,604, dated March 4, 1952, shows a separator in which an endless screen is employed for advancing clusters of hops so that they extend downwardly through the mesh to be acted upon by a rotatable beater which severs the stems as the clusters are advanced. However, with a screen conveyor of the endless belt type, the product clumps and bunches up, and without separate means for leveling the same to provide a more-or-less even flow and distribution over the screen as it advances, the beater becomes relatively ineffective. Furthermore, the product is subjected to a rather severe beating by this apparatus and damage to the same sometimes results. Also, considerable debris falls through the mesh of the screen along with the product, and this debris must be separated therefrom at added expense.

In U.S. Patent No. 2,825,375, dated March 4, 1958, a cluster breaker is shown in which inclined pick-up fingers operate in conjunction with an endless conveyor belt and a rotatable knife for separating individual cherries from clusters, the pick-up fingers serving to receive and orient and guide the cherry clusters as they move toward the knife or saw where the stems are cut as the cherries remain on the belt. While this device may adequately serve its purpose in operating on cherries or the like, its use is nevertheless limited to products having relatively long stems, and it would not be effective for breaking clusters of beans and similar products. Furthermore, the device does not provide for separation of individual single products from the clusters, and the stems are, in fact, left on the cherries by the cutter.

The type of apparatus which has probably enjoyed the greatest commercial acceptance to date is illustrated in U.S. Patent No. 3,059,648, dated October 23, 1962, wherein an endless chain conveyor having spaced cross bars is employed in combination with a sickle or knife, the cross bars of the chain providing openings between which the beans can fall so that the furcated stems are suspended on the bars as the products are advanced through the cutting zone. While these devices have been quite widely used, the beans or clusters are deposited on the conveyor in bunches, and without the provision of means for spreading out and distributing the product evenly over the conveyor in advance of the cutting zone, the effectiveness of the device is reduced and only a relatively small portion of the total number of clusters as fed to the machine are actually operated upon thus requiring repeated operations. Also, no provision is actually made in this prior device for separating the properly snipped individual beans from the conglomerated flow of clusters, stems and other debris, all of which is permitted to fall more-or-less in a common area. In addition, these prior devices are relatively bulky, cumbersome and expensive.

It is therefore a further object of this invention to provide an improved bean separator and cluster breaker which obviates all of the aforesaid objections and disadvantages of prior devices intended for similar purposes.

Another important object of my present invention is to provide an improved apparatus wherein the individual snipped beans and the bean clusters may be indiscriminately dumped or deposited upon a conveyor which is of a type which effectively levels and distributes the clustered beans for the action of the cutter while also effectively separating the properly snipped individual beans from the clusters.

A further important object of the invention is to provide an improved bean separator and cluster breaker in which the stems and other debris is effectively separated and segregated from the individual beans as they are cut apart from the furcated stems of the clusters.

Still another important object of the present invention is to provide an improved mechanical operable bean separator and cluster breaker which utilizes an oscillating conveyor having laterally spaced parallel bars and formed in a manner whereby the bean clusters are advanced in a given direction toward and into a cutting zone wherein a rotary brush operating at a faster peripheral speed than the speed of advancement of the conveyor removes the severed stems and other debris from above the conveyor as the knife or other severing means is operative below the conveyor and in the same zone as the brush for snipping the beans from their stems.

These and other objects and advantages will become apparent from the following detailed description:

A clear concept of the several features embodied in the invention and of the construction and operation of typical apparatus embodying the improvements may be had by referring to the drawing accompanying and forming a part of this specification wherein like reference characters designate the same or similar parts in the several views.

FIG. 1 is a fragmentary part sectional side elevation of a typical bean separator and cluster breaker embodying the features of the present invention;

FIG. 2 is a fragmentary top plan view of the conveying and separating portion of the device;

FIG. 3 is an end elevational view taken from the discharge end of the machine;

FIG. 4 is an enlarged longitudinal section through the separating and cluster breaking portion of the device taken generally along the line 4—4 of FIG. 3; and FIG. 5 is an enlarged transverse section through adjacent bars of the conveyor taken along the line 5—5 of FIG. 4.

While the invention has been specifically shown and described herein as being especially adapted for use in operating upon string beans or the like and as embodying oscillatory conveyors coupled together and driven in a particular manner, it is not intended or desired to thereby limit the invention by reason of such specific embodiment since the improvements may be utilized to advantage in a device for separating and breaking clusters of a number of products having furcated stems and the conveyor mechanism may be modified to suit particular needs. It is furthermore contemplated that certain descriptive terms used herein shall be given the broadest possible interpretation consistent with the disclosure.

Referring to the drawing, the improved apparatus shown therein is adapted to be mounted in any suitable manner on a base or floor 10 so as to receive supplies of beans 11 discharging from a hopper or supply chute 12. The beans as supplied to the device consist both of individual snipped beans and unseparated clusters thereof as they are stripped from the bean plants by any available mechanical bean picker or by other means, and the mixture of properly snipped beans and clusters which are held together by their furcated stems 11' are fed via the chute 12 to one end of a conveyor 13 having an initial imperforate section 14. According to the invention, the conveyor 13 is provided with a subsequent perforate section 15, and a cutter 16 is located immediately below the perforate section 15 adjacent to the terminal end 17 thereof. Immediately above the perforate section 15 within the cutting zone is a rotatable brush 18 which is revolved in a suitable manner in the direction of advancement of the beans 11 by the conveyor 13, the brush 18 being revolved at a greater peripheral speed than the speed at which the beans or similar products are advanced by the conveyor through the cutting zone so that the brush peripherally coacts with the furcated stems 11' of the bean clusters as they are acted upon by the cutter 16. Accordingly, with the brush 18 rotating in the direction of advancement of the bean clusters at a greater speed than the speed at which the clusters are advanced, the stems 11' of the clusters will be projected or thrown forwardly as they are severed by the cutter 16, and immediately beyond the terminal end 19 of the perforate section 15 of the conveyor an imperforate section 20 is provided for receiving the severed stems.

The conveyor 13 may be oscillated longitudinally in any suitable manner, and the beans fed thereto from the chute 12 are caused to level off and become distributed more-or-less uniformly over the surface of the initial section 14 of the conveyor as they are advanced thereover by reason of the oscillatory motion imparted to the conveyor. If desired, the conveyor 13 may be inclined downwardly somewhat from its inlet or receiving end to its discharge end, and the perforated section 15 thereof is peripherally formed of a series of longitudinally extending laterally spaced parallel bars, the upper surfaces of which are preferably serrated as at 22 which causes the clusters to advance forwardly on the oscillatory conveyor at a more rapid pace than the flow of the products over the initial section 14. As the individual properly snipped beans and the clusters to be broken are advanced along the conveyor 13 and leave the initial section 14 thereof, the individual beans will fall directly through the openings between the spaced bars of the section 15 to thus separate the same from the clustehs; and as the beans of the clusters fall through the spaced openings, the stems 11' thereof catch upon aand drape over the bars and the clusters are thus suspended from the bars by means of the stems until severed by the cutter 16. The severed stems 11' which are thrown forwardly by the brush 18 are then conveyed over the imperforate section 20 to a discharge chute 23 or the like for disposal. On the other hand, the individual beans which fall through the openings between the bars of the conveyor section 15 along with the beans which are cut from the furcated stems by the cutter 16 are permitted to fall by gravity to a lower conveyor 24 from which they are deposited in a discharge chute 25 or the like for further processing.

As shown, the upper and lower conveyors may, as a matter of convenience, be coupled together by bars or posts 27 with the lower conveyor being driven through a connecting rod 28 or the like carried by the eccentric of a cam shaft 29 of a suitable motor and variable speed transmission unit 30, the lower conveyor being supported for oscillatory movement on a plurality of rocker arms 31. The brush 18 has its shaft 33 journalled for rotation on the frame of the machine and is driven through sheaves 34, 35 and a chain or belt 36 as by means of a motor and transmission unit 37, 38. The cutter 16 is illustrated as being of the sickle type wherein one of the blades is reciprocated relative to the other as by means of a link or rod 40 operable by an eccentric 41 driven in a suitable manner by the motor 38 but any type of cutting device such as a saw or knife may be employed.

It is thus apparent that the invention also contemplates the provision of a method of breaking clusters of products such as beans which are joined by furcated stems, which comprises, the steps of advancing the clusters to be separated past a severing zone with the advancing clustered products suspended by their furcated stems through the openings of a perforated support. As the clusters are thus advanced in suspended condition, the depending stem portions thereof are severed as the products are successively advanced, and simultaneously with the severing step, the upper furcated stems are brushed in the direction of advancement and at a greater rate of speed than the flow of the products within the severing zone to thereby throw or project the severed stems forwardly away from the severing zone while the depending portions of the products are permitted to fall by gravity within the zone. The stems as thus removed are conveyed away from the severing zone separately from the severed falling beans or like products.

From the foregoing detailed description, it is believed apparent that the present invention contemplates the provision of a method and apparatus for effectively separating single beans from clusters and for breaking the clusters by severing the furcated stems which are effectively separated from the beans so as not to dilute the product during additional processing thereof. The apparatus embodying the invention is extremely simple in construction and can be manufactured and sold at exceptionally low cost, and the stems and beans are effectively separated simultaneously with the breaking of the clusters without need for the employment of separate means for separating the same. The beans may be fed directly to the upper deck of the oscillatory screen by way of the hopper or chute directly from the sand screen normally employed to remove a major portion of debris as the beans come from the field, and the use of the oscillatory screens insures most effectively distribution of the beans over the upper deck of the conveyor in order that maximum efficiency will result during the cutting operation. Obviously, the flow of beans across the conveyor may be speeded up or slowed down by increasing or decreasing the drive speed, and for this purpose, the motor may be provided with a variable speed transmission or with a variable pitch pulley. In addition, the conveyor may be tilted toward the discharge zone at a greater or lesser angle, and the speed of the brush may likewise be varied as necessary to most effectively act on the stems.

Various modes of carrying out the invention are contemplated as being within the scope of the following claims particularly pointing out and distinctly claiming the subject matter which is regarded as the invention.

I claim:

1. Apparatus for breaking clusters of products joined by furcated stems to separate the same, comprising, a conveyor for receiving the clusters to be separated and for advancing the same past a severing zone, said conveyor having a perforate section within which the advancing clustered products are suspended through openings by their furcated stems, said perforate section being bounded on its terminal end by an imperforate discharge section, a cutter immediately below said perforate section adjacent the terminal end thereof for severing the depending stem portions of the successive advancing products, a revolvable product stem engaging brush immediately above said perforate section and substantially in the same vertical plane as said cutter and means for revolving said brush in the direction of advancement and at a greater peripheral speed than the speed at which the products are advanced by said conveyor through the cutting zone whereby said brush peripherally coacts with the furcated stems of the successive products to positively advance the same to said cutter and also project the same away from the cutting zone and beyond said terminal end of said perforate conveyor section.

2. Apparatus according to claim 1, wherein the conveyor is of the oscillatory type and means are provided for augmenting the flow of the product therealong past the severing zone as said conveyor is oscillated.

3. Apparatus according to claim 2, wherein the perforate section of the oscillatory conveyor is composed of a series of laterally spaced parallel bars having serrated top surfaces for advancing the product by the furcated stems thereof.

4. Apparatus according to claim 1, wherein a second conveyor is provided below the first conveyor for receiving the severed product and advancing the same to a discharge zone.

5. Apparatus according to claim 1, wherein the conveyor advances the clusters along a rectilinear path and both the severing means and the brush extend transversely across the path.

6. Apparatus according to claim 1, wherein means are provided for conveying the severed stems away from the imperforate discharge section.

7. Apparatus according to claim 4, wherein both conveyors are simultaneously reciprocatable to advance their respective loads in corresponding directions.

References Cited by the Examiner

UNITED STATES PATENTS

| 883,708 | 4/08 | Fontana | 146—55 |
| 1,302,374 | 4/19 | Hunsicker | 146—55 |
| 2,336,280 | 12/43 | Miller | 130—30 |
| 2,550,129 | 4/51 | Urschel | 130—30 |
| 3,059,648 | 10/62 | Burton | 130—30 |
| 3,115,170 | 12/63 | Rodriguez et al. | 146—55 |

FOREIGN PATENTS 432,725 1948 Italy.

T. GRAHAM CRAVER, *Primary Examiner.*

ANTONIO F. GUIDA, *Examiner.*